(12) United States Patent
Hamid et al.

(10) Patent No.: US 11,661,541 B1
(45) Date of Patent: May 30, 2023

(54) WELLBORE ABANDONMENT USING RECYCLED TIRE RUBBER

(71) Applicant: Saudi Arabian Oil Company, Dhahran (SA)

(72) Inventors: Saad Hamid, Udhailiyah (SA); Nahr M. Abulhamayel, Udhailiyah (SA); Mohammed Alatigue, Dammam (SA); Abdullah A. Almulhim, Al Hufuf (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/524,232

(22) Filed: Nov. 11, 2021

(51) Int. Cl.
  *E21B 33/12* (2006.01)
  *C09K 8/42* (2006.01)

(52) U.S. Cl.
  CPC .............. *C09K 8/426* (2013.01); *E21B 33/12* (2013.01)

(58) Field of Classification Search
  None
  See application file for complete search history.

(56) References Cited

U.S. PATENT DOCUMENTS

| | | | |
|---|---|---|---|
| 2,357,559 A | 9/1944 | Smith | |
| 2,973,316 A | 7/1957 | Howland | |
| 2,818,383 A | 12/1957 | Jolly | |
| 2,844,497 A | 7/1958 | Henricks | |
| 3,098,716 A | 7/1963 | Gradishar et al. | |
| 3,101,250 A | 8/1963 | Schoenbeck | |
| 3,174,828 A | 3/1965 | Hein | |
| 3,462,239 A | 8/1969 | Swanson et al. | |
| 3,516,922 A | 6/1970 | Anzilotti | |
| 3,546,926 A | 12/1970 | Dunavent, Jr. et al. | |
| 3,629,104 A | 12/1971 | Maddox | |
| 3,725,267 A | 4/1973 | Gelblum | |
| 3,959,170 A | 5/1976 | Mago et al. | |
| 3,981,780 A | 9/1976 | Scherrer et al. | |
| 4,057,108 A | 11/1977 | Broussard | |
| 4,100,099 A | 7/1978 | Asperger et al. | |
| 4,100,100 A | 7/1978 | Clouse et al. | |

(Continued)

FOREIGN PATENT DOCUMENTS

| | | |
|---|---|---|
| CA | 1187064 | 5/1985 |
| CA | 2546164 | 3/2007 |

(Continued)

OTHER PUBLICATIONS

"Common plug techniques" IADC Drilling Manual, 2014, 5 pages.

(Continued)

*Primary Examiner* — Charles R Nold
(74) *Attorney, Agent, or Firm* — Fish & Richardson P.C.

(57) ABSTRACT

In wellbore abandonment operations using recycled tire rubber, a quantity of shredded rubber obtained by shredding waste tires is mixed with a quantity of a wellbore fluid to form a wellbore abandonment fluid. A first plug of cement is flowed into a wellbore to be abandoned. After the first plug of cement has set, the wellbore abandonment fluid is flowed into the wellbore such that the wellbore abandonment fluid contacts and is uphole of the first plug of cement within the wellbore. After flowing the wellbore abandonment fluid into the wellbore, a second plug of cement is flowed into the wellbore such that the second plug of cement contacts and is uphole of the wellbore abandonment fluid.

12 Claims, 2 Drawing Sheets

(56) References Cited

U.S. PATENT DOCUMENTS

| | | | |
|---|---|---|---|
| 4,158,548 A | 6/1979 | Burk et al. | |
| 4,253,928 A | 3/1981 | Blytas et al. | |
| 4,276,185 A | 6/1981 | Martin | |
| 4,351,673 A | 9/1982 | Lawson | |
| 4,372,873 A | 2/1983 | Nieh | |
| 4,416,333 A | 11/1983 | Mundhenk et al. | |
| 4,543,191 A | 9/1985 | Stewart et al. | |
| 4,691,778 A | 9/1987 | Pyne | |
| 4,945,758 A | 8/1990 | Carpenter | |
| 4,945,992 A | 8/1990 | Sacco | |
| 4,988,389 A | 1/1991 | Adamache et al. | |
| 4,995,952 A | 2/1991 | Dandapani et al. | |
| 5,089,781 A | 2/1992 | Arichika et al. | |
| 5,158,693 A | 10/1992 | Ramanarayan et al. | |
| 5,188,179 A | 2/1993 | Richard et al. | |
| 5,225,072 A | 7/1993 | Vidueira | |
| 5,246,597 A | 9/1993 | Jenson et al. | |
| 5,375,658 A | 12/1994 | Schultz et al. | |
| 5,431,877 A | 7/1995 | Brücken et al. | |
| 5,529,635 A | 6/1996 | Odell | |
| 5,531,865 A | 7/1996 | Cole | |
| 5,556,575 A | 9/1996 | Babaian-Kibala et al. | |
| 5,727,628 A | 3/1998 | Patzner | |
| 5,820,766 A | 10/1998 | Gevertz et al. | |
| 5,869,195 A | 2/1999 | Ramanarayanan | |
| 6,159,374 A | 12/2000 | Hart | |
| 6,241,871 B1 | 6/2001 | Donini et al. | |
| 6,332,448 B1 | 12/2001 | Ilyama et al. | |
| 6,474,349 B1 | 11/2002 | Laker | |
| 6,478,971 B1 | 11/2002 | Koefod et al. | |
| 6,575,243 B2 | 6/2003 | Pabst | |
| 6,605,234 B1 | 8/2003 | Roof | |
| 6,620,341 B1 | 9/2003 | Verma et al. | |
| 6,926,836 B2 | 8/2005 | Fidoe et al. | |
| 6,973,972 B2 | 12/2005 | Aronstam | |
| 6,986,358 B2 | 1/2006 | Mattox et al. | |
| 7,022,755 B1 | 4/2006 | Chatteiji et al. | |
| 7,057,050 B2 | 6/2006 | Meyer et al. | |
| 7,093,663 B1 | 8/2006 | Bader | |
| 7,096,945 B2 | 8/2006 | Richards et al. | |
| 7,198,722 B2 | 4/2007 | Hussain | |
| 7,306,735 B2 | 12/2007 | Baggott et al. | |
| 7,360,611 B2 | 4/2008 | Sims et al. | |
| 7,452,390 B1 | 11/2008 | Al-Khalifa | |
| 7,563,377 B1 | 7/2009 | Simpson | |
| 7,669,653 B2 | 3/2010 | Craster et al. | |
| 7,823,645 B2 | 11/2010 | Henriksen et al. | |
| 7,855,171 B2 | 12/2010 | Trahan | |
| 8,015,951 B2 | 9/2011 | Dearth et al. | |
| 8,211,300 B2 | 7/2012 | Partridge et al. | |
| 8,211,548 B2 | 7/2012 | Chun | |
| 8,307,899 B2 | 11/2012 | Benneis et al. | |
| 8,426,333 B2 | 4/2013 | Bishop et al. | |
| 8,431,508 B2 | 4/2013 | Bishop et al. | |
| 8,459,238 B2 | 6/2013 | Pursifull et al. | |
| 8,580,111 B2 | 11/2013 | Patridge et al. | |
| 8,618,027 B2 | 12/2013 | Meyer et al. | |
| 8,621,921 B2 | 1/2014 | Boe et al. | |
| 8,656,869 B2 | 2/2014 | Leone et al. | |
| 8,668,887 B2 | 3/2014 | McGarvey et al. | |
| 8,673,834 B2 | 3/2014 | Trahan | |
| 8,685,236 B2 | 4/2014 | Refere | |
| 8,899,334 B2 | 12/2014 | Merron et al. | |
| 9,085,477 B2 | 7/2015 | Banetjee et al. | |
| 9,266,754 B2 | 2/2016 | Wahid | |
| 9,643,865 B2 | 5/2017 | Matherly et al. | |
| 9,708,196 B2 | 7/2017 | Brenize et al. | |
| 10,472,576 B2 | 11/2019 | Salu et al. | |
| 10,501,680 B2 | 12/2019 | Li et al. | |
| 10,563,119 B2 | 2/2020 | Li et al. | |
| 10,927,799 B2 | 2/2021 | Hamad et al. | |
| 2002/0185439 A1 | 12/2002 | Wessels | |
| 2003/0092581 A1 | 5/2003 | Crews | |
| 2005/0263739 A1 | 12/2005 | Mattox et al. | |
| 2006/0029808 A1 | 2/2006 | Zhai et al. | |
| 2007/0108127 A1 | 5/2007 | Talbot et al. | |
| 2007/0215072 A1 | 9/2007 | Dearth et al. | |
| 2008/0236842 A1 | 10/2008 | Bhavsar et al. | |
| 2008/0289599 A1 | 11/2008 | Kurotani et al. | |
| 2009/0038801 A1* | 2/2009 | Ravi | C09K 8/46 |
| | | | 166/293 |
| 2009/0062156 A1 | 3/2009 | Wilson et al. | |
| 2009/0324820 A1 | 12/2009 | Chartier et al. | |
| 2010/0099596 A1 | 4/2010 | Trahan | |
| 2011/0315381 A1* | 12/2011 | Streetman | E21B 21/003 |
| | | | 166/292 |
| 2012/0132576 A1 | 5/2012 | Partridge et al. | |
| 2012/0255904 A1 | 10/2012 | Nagghappan | |
| 2012/0273367 A1 | 11/2012 | Themy et al. | |
| 2012/0325476 A1* | 12/2012 | Brenneis | C04B 28/021 |
| | | | 166/292 |
| 2013/0233786 A1 | 9/2013 | Posa | |
| 2013/0284518 A1 | 10/2013 | Wu et al. | |
| 2014/0011013 A1 | 1/2014 | Jin et al. | |
| 2014/0246382 A1 | 9/2014 | Matza et al. | |
| 2015/0069301 A1 | 3/2015 | Sun et al. | |
| 2015/0083397 A1 | 3/2015 | Momoe et al. | |
| 2015/0240627 A1 | 8/2015 | Gao et al. | |
| 2015/0376033 A1 | 12/2015 | Tao et al. | |
| 2017/0081223 A1 | 3/2017 | Hull et al. | |
| 2017/0198198 A1 | 7/2017 | Mahmoud et al. | |
| 2019/0100703 A1 | 4/2019 | Koleshwar et al. | |
| 2019/0135671 A1 | 5/2019 | Banks et al. | |
| 2019/0257165 A1 | 8/2019 | Toge et al. | |
| 2020/0140746 A1 | 5/2020 | Li et al. | |
| 2020/0263688 A1 | 8/2020 | Correa et al. | |
| 2021/0172407 A1 | 6/2021 | Hamad et al. | |

FOREIGN PATENT DOCUMENTS

| | | |
|---|---|---|
| CN | 101037981 | 9/2007 |
| CN | 101289062 | 10/2008 |
| CN | 104520411 | 4/2015 |
| EP | 0230683 | 8/1987 |
| EP | 662504 | 7/1995 |
| EP | 1057988 | 12/2000 |
| EP | 1663879 | 6/2006 |
| EP | 1333108 | 9/2006 |
| EP | 2836524 | 2/2015 |
| GB | 1301887 | 1/1973 |
| GB | 1374010 | 11/1974 |
| WO | WO 1993025636 | 12/1993 |
| WO | WO 2004076041 | 9/2004 |
| WO | WO 2013152832 | 10/2013 |
| WO | WO 2014115133 | 7/2014 |
| WO | WO 2015042488 | 3/2015 |
| WO | WO 2016054874 | 4/2016 |
| WO | WO 2016102568 | 6/2016 |
| WO | WO 2017123095 | 7/2017 |
| WO | WO 2017172057 | 10/2017 |

OTHER PUBLICATIONS

4college.co.uk [online], "Bromine," retrieved from URL <http://www.4college.co.uk/as/min/bromine.php>, retrieved on Mar. 31, 2020, available on or before Feb. 25, 2020, 3 pages.

Ahmed et al., "Saudi Aramco drives technological initiatives for groundwater conservation in oil & gas production facilities," IPTC 20086, Presented at the International Petroleum Technology Conference, Dhahran, Saudi Arabia, Jan. 13-15, 2020; International Petroleum Technology Conference, 2020, 14 pages.

Aittola et al., "Thermal stability of ion-exchange resins," KBS Technical Reports, Jan. 1982, 96 pages.

Al-Tammar et al., "Saudi Aramco Downhole Corrosion/Scaling Operational Experience and Challenges in HP/HT Gas Condensate Producers," Saudi Aramco Journal of Technology, May 2014, 13 pages.

Amcmud.com [online] "AMC BARITE" AMC Drilling Optimisation, Imdex Limited, 2017, retrieved on Apr. 26, 2021, retrieved from URL <https://amcmud.com/product/amc-barite/>, 1 page.

(56) References Cited

OTHER PUBLICATIONS

ASTM G3, "Standard Practice and Conventions Applicable to Electrochemical Measurements in Corrosion Testing," ASTM International, Reapproved 2014, 9 pages.

Azzouzi et al., "Inhibition effect of 1,1'-(pyridine-2,6-dihylbis(methylene))bis(5-methyl-1-Hpyrazole-3-carboxylic acid) on the corrosion of mild steel in 1 M HCL. Part A: Experimental study," Int. J. Corros. Scale Inhibi., 2017, 6(4):463-475, 13 pages.

Bader, "Sulfate removal technologies for oil fields seawater injection operations," J. of Petroleum Science and Engineering, Apr. 2006, 55: 93-110, 18 pages.

Basu et al., "Addressing the challenges of sourcing water for hydraulic fracturing by the use of membrane technologies", SPE-177792-MS, Society of Petroleum Engineers, 2015, 12 pages.

BinGhanim et al., "Scale Mitigation Strategy for Fracturing using Seawater-Based Fluid," SPE-188029-MS, Society of Petroleum Engineers, Apr. 2017, 13 pages.

Brain et al., auto.howstuffworks.com [online], "How Diesel Engines Work," How Stuff Works, Oct. 4, 2021, retrieved from URL <https://auto.howstuffworks.com/diesel3.htm>, retrieved on Nov. 24, 2021, 3 pages.

Chandrasekaran, "Chapter 2—Rubber Properties for Functional Seal Requirements," Rubber Seals for Fluid and Hydraulic Systems, 2010, 16 pages.

Chen et al., "Novel pore size tuning method for the fabrication of ceramic multi-channel nanofiltration membrane," Journal of Membrane Science, 2018, 552: 77-85.

Crabtree et al., "Fighting Scale—Removal and Prevention," Oilfield Review, Autumn 1999, 16 pages.

Da et al., "Preparation of zirconia nanofiltration membranes through an aqueous sol-gel process modified by glycerol for the treatment of wastewater with high salinity," Journal of Membrane Science, 2016, 504: 29-39.

Dadari et al., "Crude oil desalter effluent treatment using high flux synthetic nanocomposite NF membrane-optimization by response surface methodology," Desalination, Elsevier, Amsterdam, NL, Sep. 2015, 377: 34-46, XP029287214, 13 pages.

Dohare et al., "Pyranpyrazole Derivatives as Novel Corrosion Inhibitors for Mild Steel Useful for Industrial Pickling Process: Experimental and Quantum Chemical Study," Journal of Industrial Engineering Chemistiy, 2017, 52:197-210, 14 pages.

El Hajjaji et al., "Corrosion Resistance of Mild Steel Coated with Organic Material Containing Pyrazol Moiety," Coatings, 2018, 8:330, 17 pages.

El-Lateef et al., "Corrosion Protection of Steel Pipelines Against CO2 Corrosion—A Review," Chemistry Journal, 2012, 2(2):52-63, 13 pages.

EnvTech Inc., "ETI Cleaning & Gas Freeing Solution," EnvTech Inc., Jun. 25, 2011, 5 pages.

Fao.org [online], "Definition and Classification of Commodities 13. Tobacco and Rubber and Other Crops," FAO, available on or before 1994, retrieved on Nov. 24, 2021, retrieved from URL <https://www.fao.org/waicent/faoinfo/economic/faodef/fdef13e.htm>, 4 pages.

Feng et al., "Effects of CO$_2$ and H$_2$S on Corrosion of Martensitic Steels in NaCl at Low Temperature," Paper No. 7659, NACE International, Corrosion 2016 Conference and Expo, Mar. 6-10, 2016, 13 pages.

Ferguson and Ferguson, "The Chemistry of Strontium and Barium Scales", Association of Water Technologies Oct. 20-23, 2010, Reno, NV, USA, 17 pages.

Firefighterinsider.com [online], "Is Diesel Fuel Flammable?," Firefighter Insider, available on or before Nov. 26, 2020, via Internet Archive: Wayback machine URL <http://web.archive.org/web/20201126010541/https://firefighterinsider.com/is-diesel-flammable-yes-and-no/>, retrieved on Nov. 24, 2021, URL <https://firefighterinsider.com/is-diesel-flammable-yes-and-no/>, 19 pages.

Firefighterinsider.com [online], "Is Rubber Highly Flammable?," Firefighter Insider, available on or before Jul. 6, 2021, via Internet Archive: Wayback Machine URL <http://web.archive.org/web/20210706125329/https://firefighterinsider.com/rubber-flammable/>, retrieved on Nov. 24, 2021, URL <https://firefighterinsider.com/rubber-flammable/>.

Ge et al. "Progress on the Extraction Techniques of Bromine," International Symposium on Energy Science and Chemical Engineering (ISESCE 2015), Jan. 2015, 6 pages.

Guo et al., "Fabrication and characterization of TiO2/ZrO2 ceramic membranes for nanofiltration," Microporous and Mesoporous Materials, Apr. 2018, 360: 125-131.

He et al., "Kinetics and Equilibrium of Barium and Strontium Sulfate Formation in Marcellus Shale Flowback Water", J. of Environmental Engineering, Jan. 2014, 140(5): B4014001-1, 9 pages.

Herrag et al., "Pyrazole Derivatives as Corrosion Inhibitors for Steel in Hydrochloric Acid," Portualiae Electrochimica Acta, 2008, 26:211-220, 10 pages.

Hoshowski et al., "The development of novel corrosion inhibitors for high temperature sour gas environments," NACE International Paper No. C-2020-14591, 2020, 9 pages.

Industrialrubbergoods.com [online], "Types of Synthetic Rubber," Industrial Rubber Goods, The Buyers Goods, available on or before Feb. 25, 2017, via Internet Archive: Wayback Machine URL <http://web.archive.org/web/20170225033306/http://www.industrialrubbergoods.com/types-of-synthetic-rubber.html>, retrieved on Nov. 24, 2021, URL http://www.industrialrubbergoods.com/types-of-synthetic-rubber.html>, 3 pages.

Kahyarian et al., "CO2 corrosion of mild steel," Trends in Oil and Gas Corrosion Research and Technologies, Elsevier, 2017, 42 pages.

Kaplan et al., "Assessment of desalination technologies for treatment of a highly saline brine from a potential CO2 storage site," Desalination, Feb. 2017, 404: 87-101.

Khalifeh et al., "Chapter 7 Fundamentals of Plug Placement," Introduction to Permanent Plug and Abandonment of Wells , OEO, vol. 12, Jan. 2020, 185-212, 28 pages.

Koujan Fertilizers & Chemicals, Liquid Potassium Polysulfide, 2018, 1 pages.

Lerner, anl.gov [online], "7 things you might not know about diesel," Argonne National Laboratory, Jun. 1, 2014, retrieved on Nov. 24, 2021, retrieved from URL <https://www.anl.gov/article/7-things-you-might-not-know-about-diesel>.

Leroy, "Corrosivity of water, criteria for ferrous metal protection by calcium carbonate," European Journal of Water Quality, ASEES, 2012, 43: 75-87, 13 pages, English Abstract only.

Li et al., "A Novel Approach to Predict the Co-Precipitation of BaSO4 and SrSO4", SPE 29489, Society of Petroleum Engineers, Apr. 1995, 447-461, 15 pages.

Li et al., "High-TDS produced water based, low-damaging fracturing fluids for applications at 300oF or higher", SPE-191749-MS, Society of Petroleum Engineers, Sep. 2018, 14 pages.

Liu et al., "Understanding thermal stability and inhibition effectiveness of corrosion inhibitors at high temperatures," NACE International Paper No. 7535, 2016, 11 pages.

Mazumder et al., "Design and synthesis of a novel class of inhibitors for mild steel corrosion in acidic and carbon dioxide-saturated saline media," Corros. Sci., 2014, 87:187-198, 12 pages.

Mccafferty et al., "Field Performance in the Practical Application of Chlorine Dioxide as a Stimulation Enhancement Fluid," XP55492044, SPE Production and Facilities, vol. 8, No. 1, Feb. 1, 1993, 6 pages.

Merdhah and Yassin, "Laboratory study and prediction of calcium sulphate at high-salinity formation water," The Open Petroleum Engineering Journal, 2008, 1: 62-73, 12 pages.

Merdhah and Yassin, "Laboratory Study on Precipitation of Barium Sulphate in Malaysia Sandstone Cores", The Open Petroleum Engineering Journal, 2009, 2: 1-11, 11 pages.

Mohamed et al., "Removal of Pyrite and Different Types of Iron Sulfide Scales in Oil and Gas Wells without H2S Generation," XP55492021, International Petroleum Technology Conference, Jan. 1, 2015, 8 pages.

Nasr-El-Din et al., "Iron Sulfide Scale: Formation, Removal and Prevention," International Symposium on Oilfield Scale, Jan. 30, 2001, 13 pages.

(56) References Cited

OTHER PUBLICATIONS

Oilfieldwiki.com' [online], "Iron Sulfide (FeS)," available on or before Dec. 30, 2013, via Internet Archive: Wayback Machine URL <https://web.archive.org/web/20131230064221/http://www.oilfieldwiki.com/wiki/Iron_sulfide_(FeS)> [retrieved on Mar. 15, 2018], from URL: <http://www.oilfieldwiki.com/wiki/Iron_sulfide_(FeS)>, 5 pages.

P.F. Timmins, "Predictive Corrosion and Failure Control in Process Operations: As Applied to the Refining, Petrochemical, and Process Industries," ASM International, Dec. 1996, 23 pages.

Paidar, "Membrane electrolysis—History, current status and perspective," Electrochimica Acta., Aug. 2016, 209:737-756.

Puntervold and Austad, "Injection of Seawater and Mixtures With Produced Water Into North Sea Chalk Formation: Impact on Wettability, Scale Formation, and Rock Mechanics Caused by Fluid-Rock Interaction," SPE-111237, Society of Petroleum Engineers, Oct. 2007, 12 pages.

Purolite.com [online], "Purolite Bromide Plus /9218," retrieved from URL <https://www.purolite.com/product-pdf/BROMIDE-PLUS-9218.pdf> retrieved on Mar. 31, 2020, available on or before Mar. 31, 2020, 1 page.

Rashid, "Removing problematic sulphates from abundantly available seawater to boost oil recovery operations," GE Sulphate Removal Technology, GE Water & Process Technologies, Oct. 2017, 20 pages.

Richter [online], "Current Research: NF-Membranes for the cleaning of "Recycle Water" in oil sand extractions," Fraunhofer Department of Nanoporous Membranes, 2019, [retrieved o Dec. 24, 2019], retrieved from: URL <https://www.ikts.fraunhofer.de/en/departments/environmental_process_engineering/nanoporous_membranes/zeolite_membranes_nanocomposites/cr_nf_membranes_for_cleaning.html>, 3 pages.

Singare et al., "Study on Halide Ions Selectivity of Industrial Grade Anion Exchange Resin Auchlite A-378," International Letters of Chemistry, Physics and Astronomy, Mar. 2014, 11(1):44-50.

Singh et al., "Bispyranopyrazoles as Green Corrosion Inhibitors for Mild Steel in Hydrochloric Acide: Experimental and Theoretical Approach," ASC Omega, 2018, 3:11151-11162, 12 pages.

Song et al., "TiO2 nanofiltration membranes prepared by molecular layer deposition for water purification," Journal of Membrane Science, Jul. 2016, 510: 72-78.

Soyluoglu, "Removal of bromide from natural waters: Bromide-selective vs. conventional ion exchange resins," Chemosphere, Jan. 2020, 238:1-9.

Talbot et al., "TetrakisHydroxymethyl Phosphonium Sulfate (THPS) for Dissolving Iron Sulfides Downhole and Topsides—A study of the Chemistry Influencing Dissolution," XP55443209, Corrosion, Apr. 7, 2002, 14 pages.

Trid.trb.org [online], "Water Absorption in Rubbers," TRID, Polymers in a Marine Environment Conference, London, Oct. 31-Nov. 2, 1984, retrieved on Nov. 24, 2021 from URL <https://trid.trb.org/view/391119>.

Usman et al., "Carbon dioxide corrosion inhibitors: A review," Arab. J. Sci. Eng., 2017, 23 pages.

Vasudevan, "Membranes and Diaphragms for Electrochemical Processes (Part-I)," Res. J. Chem. Sci., Feb. 2013, 3(2):1-3.

Veoliawatertechnologies.com [online], "OPUS® Technology: Overview," Veolia Products Listing, 2019, [retrieved on Dec. 24, 2019], retrieved from: URL <https://www.veoliawatertechnologies.com/en/solutions/products/opus-technology>, 4 pages.

Yadav et al., "Electrochemical investigation of Substituted Pyranopyrazoles Adsorption on Mild Steel in Acid Solution," Industrial & Engineering Chemistry Research (I&EC Research), 2012, 51:8194-8210, 17 pages.

Yap et al., "Removing Iron Sulfide Scale: A Novel Approach," XP55443526, Abu Dhabi International Petroleum Exhibition and Conference, Jan. 1, 2010, 10 pages.

Zeidler et al., "Preparation and Characterization of New Low MWCO Ceramic Nanofiltration Membranes for Organic Solvents," Journal of Membrane Science, 2014, 470: 421-430.

Zeidler et al., "New Ceramic Membranes for Organic Solvent Nanofiltration with a Molecular Weight Cut-Off < 500 Da," Procedia Engineering, Jan. 2012, 44: 646-648.

Zhang et al., "Corrosion Monitoring Under Iron Sulfide Deposite: Testing Method Development," XP055471382, Corrosion 2014, Mar. 9, 2014, 15 pages.

Zhang, "Solid solution formation kinetics—A preliminary study for CaCO3—BaCO3 and BaSO4—SrSO4 system", Master's Thesis Rice University, Aug. 2013, 24 pages.

* cited by examiner

WELLBORE ABANDONMENT USING RECYCLED TIRE RUBBER

TECHNICAL FIELD

This disclosure relates to wellbore operations, specifically, to wellbore abandonment operations.

BACKGROUND

Wellbores are formed in subterranean zones to retrieve hydrocarbons (for example, petroleum, gas, combinations of them) that are trapped in the formation or formations that make up the subterranean zones. Over time, the ability of a wellbore to produce hydrocarbons decreases. When hydrocarbons can no longer be produced from a wellbore, the life of the wellbore ends. At that time, the wellbore must be abandoned by plugging the wellbore. To plug the wellbore, a fluid mixture is flowed into the wellbore at desired depths where the mixture hardens to form a plug. The plug prevents fluids from the subterranean zone from flowing into the well, thereby preventing zonal contamination that can be caused by fluid from one portion of the subterranean zone flowing into another portion of the subterranean zone. Fluid mixtures used to plug and abandon wellbores in this manner can be made using materials such as cement, kiln dust, ash, shale, or combinations of them mixed with a liquid such as water, drilling fluid, gels or similar liquid that can be pumped into the wellbore.

SUMMARY

This disclosure describes technologies relating to wellbore abandonment using recycled tire rubber.

Certain aspects of the subject matter described here can be implemented as a method. A quantity of shredded rubber obtained by shredding waste tires is mixed with a quantity of a wellbore fluid to form a wellbore abandonment fluid. A first plug of cement is flowed into a wellbore to be abandoned. After the first plug of cement has set, the wellbore abandonment fluid is flowed into the wellbore such that the wellbore abandonment fluid contacts and is uphole of the first plug of cement within the wellbore. After flowing the wellbore abandonment fluid into the wellbore, a second plug of cement is flowed into the wellbore such that the second plug of cement contacts and is uphole of the wellbore abandonment fluid.

This, and other aspects, can include one or more of the following features. The waste tires can be shredded through cryogenic or mechanical techniques.

This, and other aspects, can include one or more of the following features. The quantity of shredded rubber can be mixed with the quantity of the wellbore fluid such that a concentration of the shredded rubber in the wellbore abandonment fluid is between 1% and 10% by weight.

This, and other aspects, can include one or more of the following features. The wellbore fluid includes at least one of brine, drilling mud or gels.

This, and other aspects, can include one or more of the following features. The wellbore fluid is drilling mud and is either an oil-based or a water-based drilling mud.

This, and other aspects, can include one or more of the following features. In a step (a), after the second plug of cement has set, the wellbore abandonment fluid is flowed into the wellbore such that the wellbore abandonment fluid contacts and is uphole of the second plug of cement within the wellbore. In a step (b), after flowing the wellbore abandonment fluid into the wellbore, a third plug of cement is flowed into the wellbore such that the third plug of cement contacts and is uphole of the wellbore abandonment fluid. The steps (a) and (b) are repeated until a surface of the wellbore is reached. The surface of the wellbore is plugged with another plug of cement.

Certain aspects of the subject matter described here can be implemented as a method. A plug of cement is flowed into a wellbore to be abandoned. After the plug of cement has set, a quantity of a wellbore abandonment fluid and a quantity of a plug of cement are alternately flowed, waiting for the plug of cement to set before flowing the quantity of the wellbore abandonment fluid, until a surface of the wellbore is reached. Each quantity of the wellbore abandonment fluid includes a mixture of rubber powder obtained by shredding rubber tires and well fluid. The surface of the wellbore is plugged with another plug of cement.

This, and other aspects, can include one or more of the following features. The wellbore abandonment fluid is formed by mixing rubber powder with wellbore fluid such that a concentration of the rubber powder in the wellbore abandonment fluid is between 1% and 10% by weight.

This, and other aspects, can include one or more of the following features. The waste tires are shredded through cryogenic or mechanical techniques to form the rubber powder.

This, and other aspects, can include one or more of the following features. The wellbore fluid includes at least one of brine, drilling mud or gels.

This, and other aspects, can include one or more of the following features. The wellbore includes drilling mud which is an oil-based or a water-based drilling mud.

Certain aspects of the subject matter described here can be implemented as a method. Waste tire rubber is shredded into shredded rubber. At least a portion of the shredded rubber is mixed with a quantity of a wellbore fluid to form a wellbore abandonment fluid that includes at least the portion of the shredded rubber. The wellbore abandonment fluid is pumped into a wellbore during operations to abandon the wellbore.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes processes of utilizing tire rubber in oil and gas wells. By implementing the techniques described in this disclosure, rubber obtained from used tires that are meant for disposal in landfills can be repurposed and used in wellbore plug and abandonment processes. Every year, millions of used tires obtained from vehicles go to landfills. Most of these tires are transformed into a course or fine rubber powder (RP) through cryogenic or mechanical methods. The RP is sometimes called shredded rubber (SR) or crumb rubber (CR). This disclosure describes use and application of the RP in wellbore operations.

Although more than 1 billion unserviceable tires are generated each year, only a fraction are reused. Implementing the techniques described in this disclosure as a meaningful use to such used tires. Also, implementing the techniques described in this disclosure enables safe disposal of rubber waste downhole in oil and gas wellbores without coming in contact with freshwater resources. In this manner, chances of negative environmental impact can be decreased while providing an additional venue for safe disposal of tire rubber waste.

Figure 1:
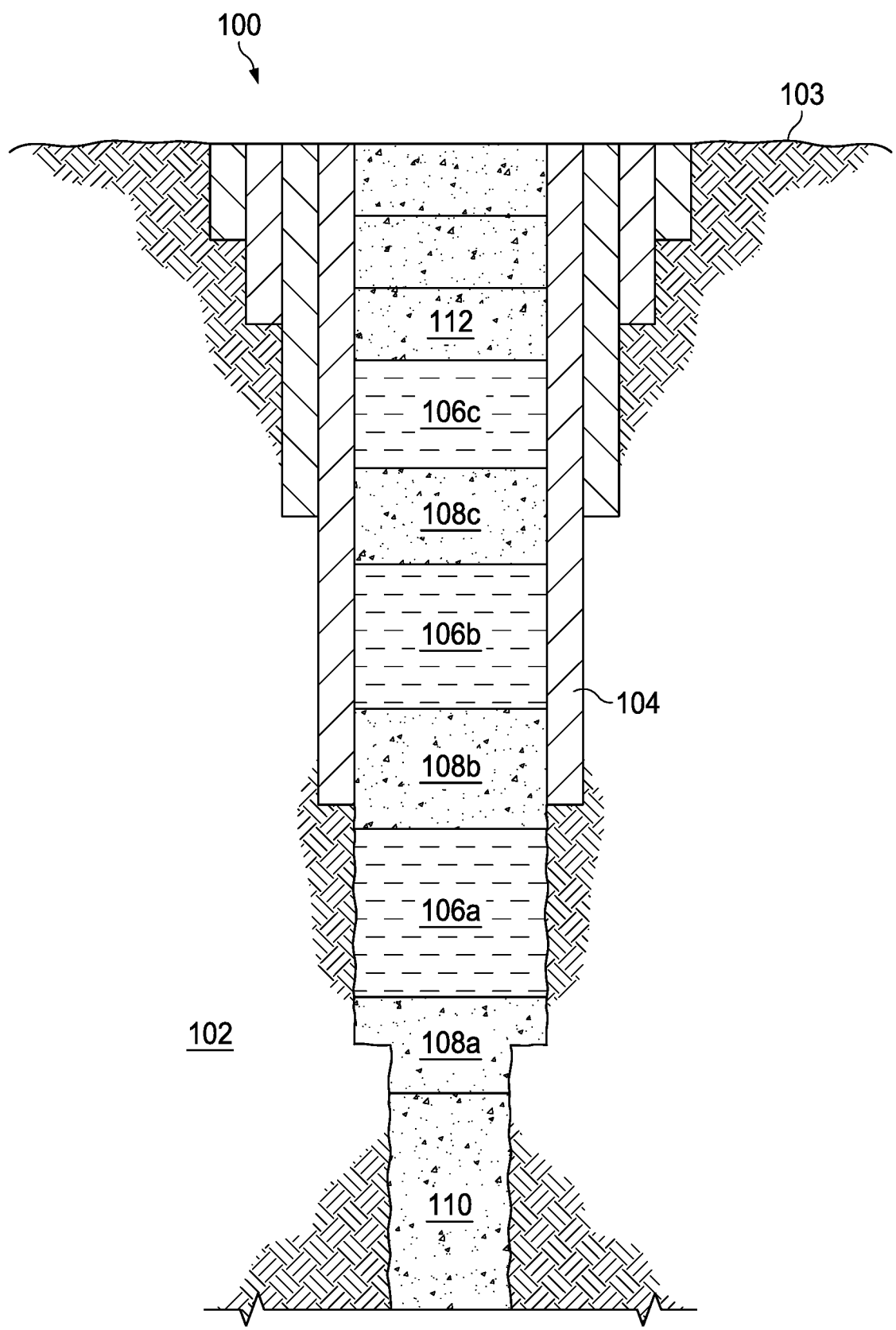
FIG. 1 is a schematic of a wellbore that has been abandoned using techniques described in this disclosure.

FIG. 1 is a schematic of a wellbore 100 that has been abandoned using techniques described in this disclosure. The wellbore 100 is formed in a subterranean zone 102, which can include a formation, a portion of a formation, or multiple formations. Starting at the surface 103, the wellbore 100 is formed in the subterranean zone 102 using a wellbore drilling assembly (not shown). The wellbore 100 can be cased. In a cased wellbore, multiple pieces of casing 104 are telescopingly positioned within the wellbore 100 and cemented in place. Hydrocarbons can be produced through the wellbore 100 until it reaches the end of its life, at which the wellbore 100 is abandoned.

To abandon the wellbore 100, a plugging composition, for example, cement 110 is pumped into the wellbore 100, specifically to the bottom of the wellbore 100. A quantity of the cement 110 depends on the vertical depth of the subterranean zone 102 at the bottom of the wellbore 100 that needs to be plugged.

After this cement 110 is set in the wellbore, the wellbore operator performs cement plug pressure testing. Once the pressure testing has been completed, the wellbore operator can prepare the wellbore abandonment fluid. To do so, in some implementations, the wellbore operator can mix a quantity of shredded rubber opened by shredding waste tires with a quantity of a wellbore fluid to form a wellbore abandonment fluid. The wellbore fluid can include water, diesel, gel, brine or drilling mud (for example, oil-based or water-based drilling mud). For example, a concentration of the shredded rubber in the wellbore abandonment fluid can be about 1 to 10% by weight. In the context of this disclosure, "about" encompasses a variance of ±5% from a disclosed value. Consequently, an actual concentration of the shredded rubber in the wellbore abandonment fluid can be less than 1% or more than 10% by weight. In some implementations, after adding the shredded rubber to the wellbore fluid, the operator can continuously agitate the mixture, for example, in a mixing pod or blender, to prevent the shredded rubber from settling.

The wellbore operator can then flow additional cement and form a cement plug 108a at the downhole end of the wellbore 100, for example, immediately above the cement 110. After the cement plug 108a has set, the wellbore operator can flow a portion of the wellbore abandonment fluid into the wellbore 100 such that the wellbore abandonment fluid 106a contacts and is uphole of the cement plug 108a within the wellbore 100. To flow the portion of the wellbore abandonment fluid 106a into the wellbore 100, the wellbore operator can rig up hoses from the mixing pod or blender to a pump that can draw the portion of the wellbore abandonment fluid and pump that portion into the wellbore 100. To ensure that the wellbore abandonment fluid does not get absorbed by the cement plug 108a, the cement plug 108a is allowed to cure/set before pumping the wellbore abandonment fluid into the wellbore 100.

A quantity of the portion of the wellbore abandonment fluid 106a pumped into the wellbore 100 depends on a vertical depth to be occupied by the fluid 106a. In some implementations, the wellbore operator can determine a volume of the fluid 106a using the vertical depth and the diameter of the wellbore 100. In some implementations, the wellbore operator can start pumping the mixture of the wellbore abandonment fluid into the wellbore 100 until the returns are seen at the surface 103. By "returns," it is meant that the well will overflow. Seeing returns at the surface means seeing the overflowing fluid at the surface.

Upon determining that a suitable quantity of the wellbore abandonment fluid has been pumped into the wellbore 100, the wellbore operator can displace pumping lines with clean fluid and stop pumping. Then, the wellbore operator can pump another cement plug (for example, cement plug 106b) into the wellbore 100 to reside above the wellbore fluid 106a. To avoid inter-mixing between the cement plug 106b and the wellbore fluid 106a, the densities of the cement and the wellbore abandonment fluid are selected such that the wellbore abandonment fluid floats above the cement, a technique called balanced plug in the oilfield. Alternatively, or in addition, in some implementations, spacer fluids of appropriate density can be pumped into the wellbore 100 while setting the plug to ensure that cement contamination does not occur and that the cement is set and cured while floating above the wellbore abandonment fluid below. In some implementations, a mechanical base such as a cement retainer can be placed and set within the wellbore 100 immediately above the wellbore abandonment fluid prior to flowing the cement plug.

The wellbore operator can repeat the steps described earlier to alternately pump a cement plug (for example, cement plug 108b, cement plug 108c) and a quantity of a wellbore abandonment fluid (for example, fluid 106b, fluid 106c). At the end of such pumping, a quantity of the wellbore abandonment fluid is sandwiched between two cement plugs, and a cement plug is similarly sandwiched between two plugs of wellbore abandonment fluid. Once the wellbore 100 has been filled to near the surface 103, the wellbore operator can pump a cement plug 112 to the surface 103 of the wellbore 100. Once the plugs are set, a gate valve with a blind flange and pressure gauge can be mounted on the wellhead to monitor any accidental pressure build up as a result of cement plug failure.

Figure 2:
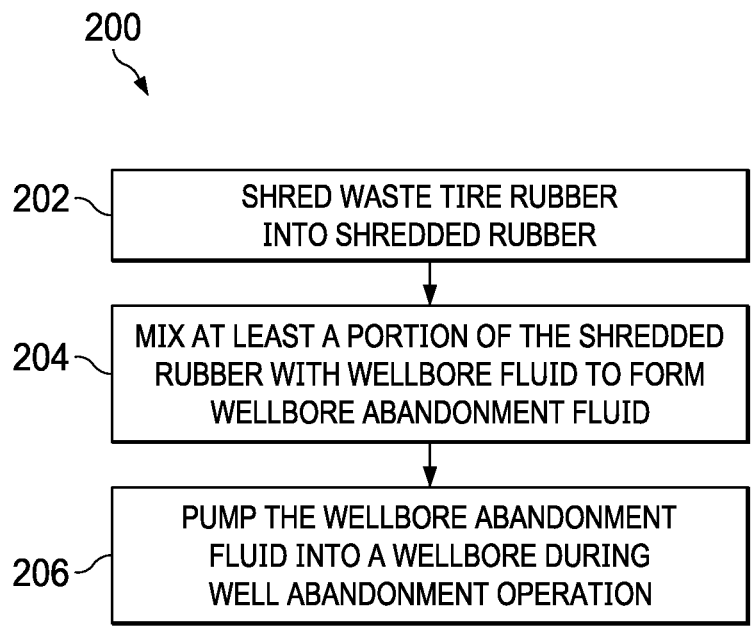
FIG. 2 is a flowchart of an example of a method of abandoning a wellbore using techniques described in this disclosure.

FIG. 2 is a flowchart of an example of a method 200 of abandoning a wellbore using techniques described in this disclosure. Some or all of the method steps shown in FIG. 2 can be implemented manually, for example, by wellbore operators. At 202, waste tires rubber can be shredded into shredded rubber. At 204, at least a portion of the shredded rubber is mixed with wellbore fluid to form wellbore abandonment fluid. At 206, the wellbore abandonment fluid is pumped into a wellbore, for example, wellbore 100, during wellbore abandonment operations. Details of the method 200 are described with reference to FIG. 1 and the method 300 described with reference to FIG. 3.

When implementing the method 200, rubber, specifically waste rubber obtained from used tires that are otherwise meant to be discarded, is used to form the wellbore abandonment fluid. Rubber is a flexible substance derived from the extraction of certain tropical plants (natural rubber) or from petroleum and natural gas (synthetic rubber). Due to its flexibility, elasticity and rigidity, rubber is used as the main component of tires used in automotive vehicles, airplanes, bicycles, and many other materials and equipment.

Rubber, in its natural or synthetic state, is not highly flammable. By itself, rubber has a high autoignition temperature of 500 to 600° F. (262 316° C.). Synthetic rubber burns at 320° C. (608° F.). Rubber is a poor thermoconductor and is consequently a heat resistant material. Rubbers usually have long and regular macromolecule chains without bulk substitutes with spatially oriented structural units. Such structure allows segments of rubbers to be movable and rotatable around simple chemical bonds even at low temperatures, as can be seen in their low vitrification temperature ($T_g$). Rubbers are tough and similar to plastomers below the vitrification temperature or crystallization temperature, if rubber can be crystallized. When heated, rubbers change their elastic and/or hyper-elastic state to a visco-elastic state. In such states, rubbers become plastic and flow above the softening temperature ($T_m$). It is advantageous if rubbers crystallize at normal temperature only when subjected to voltage and their vitrification temperature is lower than the temperature at which they are used. To summarize, because the autoignition or kindling temperature of rubber is higher than the temperature that the rubber can expect to encounter inside a wellbore, rubber is a suitable material to use in a well abandonment fluid.

Although rubber, by itself, has a high autoignition or kindling temperature, once it starts burning, it's fumes can be toxic and difficult to extinguish. Moreover, a solution of rubber with compounds such as water, diesel or gel can ignite depending on the lattice structure or the manufacturing process used to make the solution.

For example, normal rubber does not absorb water even though surface adsorption may give an impression of absorption. Unless an impurity is added to the rubber, its structure does not allow water absorption. Also, the water molecules, $H_2O$, has positive and negative charges. If the surface of the absorbing material is also charged these charges will attract the water molecules. Rubbers are generally organic polymers which have hydrophobic engines all over the structure. The organic groups have affinity to organic species and polar groups have affinity to polar species. Water is polar in nature, and hence is repelled by the organic groups present in the rubber. Absorption is also affected by the surface of the absorbing material. Rubber will not absorb water, whereas a non-woven felt will. To summarize, because a fluid mixture of rubber and water is unlikely to ignite at the temperatures and pressures that the mixture will encounter inside a wellbore, a well abandonment fluid that includes water and rubber is suitable for use in well abandoning operations.

Diesel, taken by itself, is flammable. Flammability of a fuel is affected by vaporization of that fuel. Compared to vaporization of gasoline or kerosene, the vaporization of diesel is less. Because rubber is not highly flammable, except at the elevated temperatures mentioned above, a fluid mixture of rubber and diesel is even less flammable than the diesel alone. Consequently, the fluid mixture of rubber and diesel is also unlikely to ignite at the temperatures and pressures that the mixture will encounter inside a wellbore, making the mixture suitable for use in well abandoning operations.

A fluid mixture of rubber gel is also unlikely to ignite at the temperatures and pressures that the mixture will encounter inside a wellbore. Natural rubber, as it exudes from tree trunks, is a milky, viscous latex consisting of about 40% (w/v) of long chain cis-1,4-polyisoprene molecules together with a small amount of protein. It is somewhat gel-like before it hardens. Jails, on the other hand, can include polysaccharides or proteins interbonded with water molecules to form a 3D cross-linked network. Synthetic rubbers, which are petroleum products, can be made to be gel-like when swollen with an oil. In sum, liquids like water or flammable liquids like diesel and xylene are acceptable base fluids in which powdered rubber can be added to form well abandonment fluids that can be used with low risk of igniting after the wellbore has been abandoned.

Figure 3:
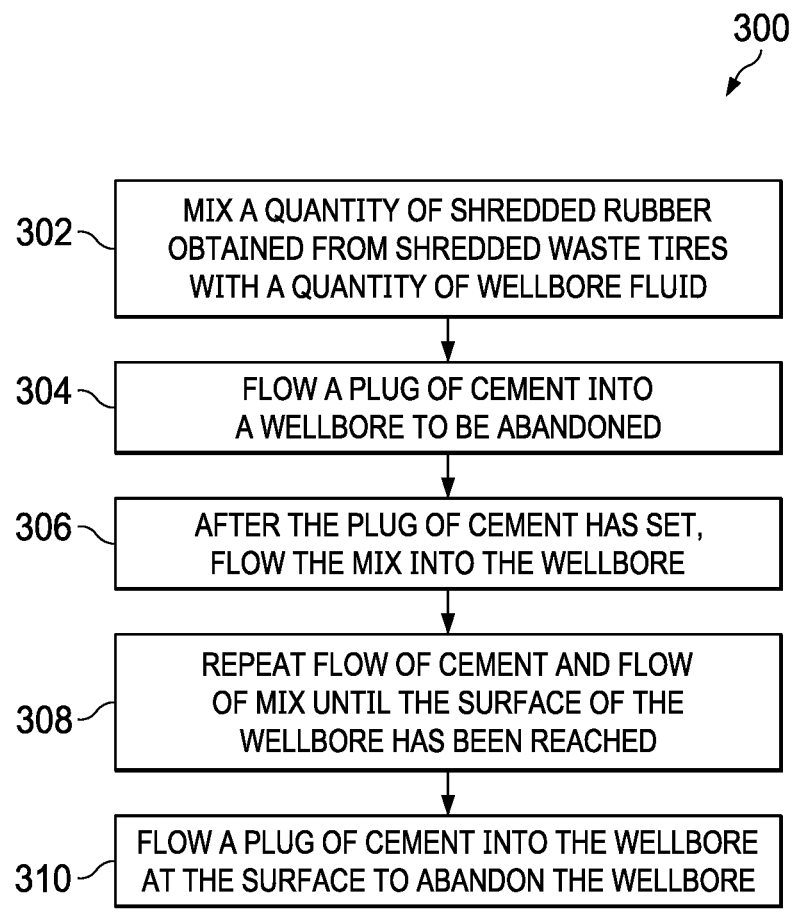
FIG. 3 is a flowchart of an example of a method of abandoning a wellbore using techniques described in this disclosure.

FIG. 3 is a flowchart of an example of a method 300 of abandoning a wellbore using techniques described in this disclosure. Some or all of the method steps shown in FIG. 2 can be implemented manually, for example, by wellbore operators. As a precursor to implementing the method 300, the wellbore operator can obtain or prepare rubber powder by shredding used rubber tires. In the context of this disclosure, a used rubber tire is one that has been used and has worn out to an extent that it can no longer be used, but needs to be disposed. Used rubber tired can be shredded to form rubber powder by cryogenic or mechanical methods. Such methods can be implemented using rubber recycling plants in which the tires are cut into 2-inch pieces and then treated with chemicals to create find powder, granules and the like. To do so, a special machine can grind the tires into pieces using the ambient process. The size is regulated by a special granulator. Alternatively or in addition, the tires can be frozen with liquid nitrogen and broken into crumbs by a hammer mill. The particles of steel are removed with a magnet, and all other fibers are taken out with air classifiers.

At 302, a quantity of the rubber powder (from shredded waste tires) is mixed with the quantity of wellbore fluid. At 304, a plug of cement is flowed into a wellbore to be abandoned. At 306, after the plug of cement has set, the mix is flowed into the wellbore. At 308, flow of cement and flow of the mix is alternately repeated until the surface of the wellbore has been reached. At 310, a plug of cement is flowed into the wellbore at the surface to abandon the well.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   mixing a quantity of shredded rubber obtained by shredding waste tires with a quantity of a wellbore fluid to form a wellbore abandonment fluid;
   flowing a first plug of cement into a wellbore to be abandoned;
   after the first plug of cement has set, flowing the wellbore abandonment fluid into the wellbore such that the wellbore abandonment fluid contacts and is uphole of the first plug of cement within the wellbore; and
   after flowing the wellbore abandonment fluid into the wellbore, flowing a second plug of cement into the wellbore such that the second plug of cement contacts and is uphole of the wellbore abandonment fluid.

2. The method of claim 1, further comprising shredding waste tires through cryogenic or mechanical techniques.

3. The method of claim 1, wherein mixing the quantity of shredded rubber with the quantity of the wellbore fluid such that a concentration of the shredded rubber in the wellbore abandonment fluid is between 1% and 10% by weight.

4. The method of claim 1, wherein the wellbore fluid comprises at least one of brine, drilling mud or gels.

5. The method of claim 4, wherein the wellbore comprises drilling mud, wherein the drilling mud is an oil-based or a water-based drilling mud.

6. The method of claim 1, further comprising:
a) after the second plug of cement has set, flowing the wellbore abandonment fluid into the wellbore such that the wellbore abandonment fluid contacts and is uphole of the second plug of cement within the wellbore;
b) after flowing the wellbore abandonment fluid into the wellbore, flowing a third plug of cement into the wellbore such that the third plug of cement contacts and is uphole of the wellbore abandonment fluid;
repeating steps (a) and (b) until a surface of the wellbore is reached; and
plugging the surface of the wellbore with another plug of cement.

7. A method comprising:
flowing a plug of cement into a wellbore to be abandoned;
after the plug of cement has set, alternately flowing a quantity of a wellbore abandonment fluid and a quantity of a plug of cement, waiting for the plug of cement to set before flowing the quantity of the wellbore abandonment fluid, until a surface of the wellbore is reached, wherein each quantity of the wellbore abandonment fluid includes a mixture of rubber powder obtained by shredding rubber tires and well fluid; and
plugging the surface of the wellbore with another plug of cement.

8. The method of claim 7, further comprising forming the wellbore abandonment fluid by mixing rubber powder with wellbore fluid such that a concentration of the rubber powder in the wellbore abandonment fluid is between 1% and 10% by weight.

9. The method of claim 8, further comprising shredding waste tires through cryogenic or mechanical techniques to form the rubber powder.

10. The method of claim 7, wherein the wellbore fluid comprises at least one of brine, drilling mud or gels.

11. The method of claim 10, wherein the wellbore comprises drilling mud, wherein the drilling mud is an oil-based or a water-based drilling mud.

12. A method comprising:
shredding waste tire rubber into shredded rubber;
mixing at least a portion of the shredded rubber with a quantity of a wellbore fluid to form a wellbore abandonment fluid comprising at least the portion of the shredded rubber; and
pumping the wellbore abandonment fluid into a wellbore during operations to abandon the wellbore.

* * * * *